H. K. DIFFENDERFER.
AIR FILTER AND PURIFIER.
APPLICATION FILED OCT. 25, 1910.
997,442.
Patented July 11, 1911.
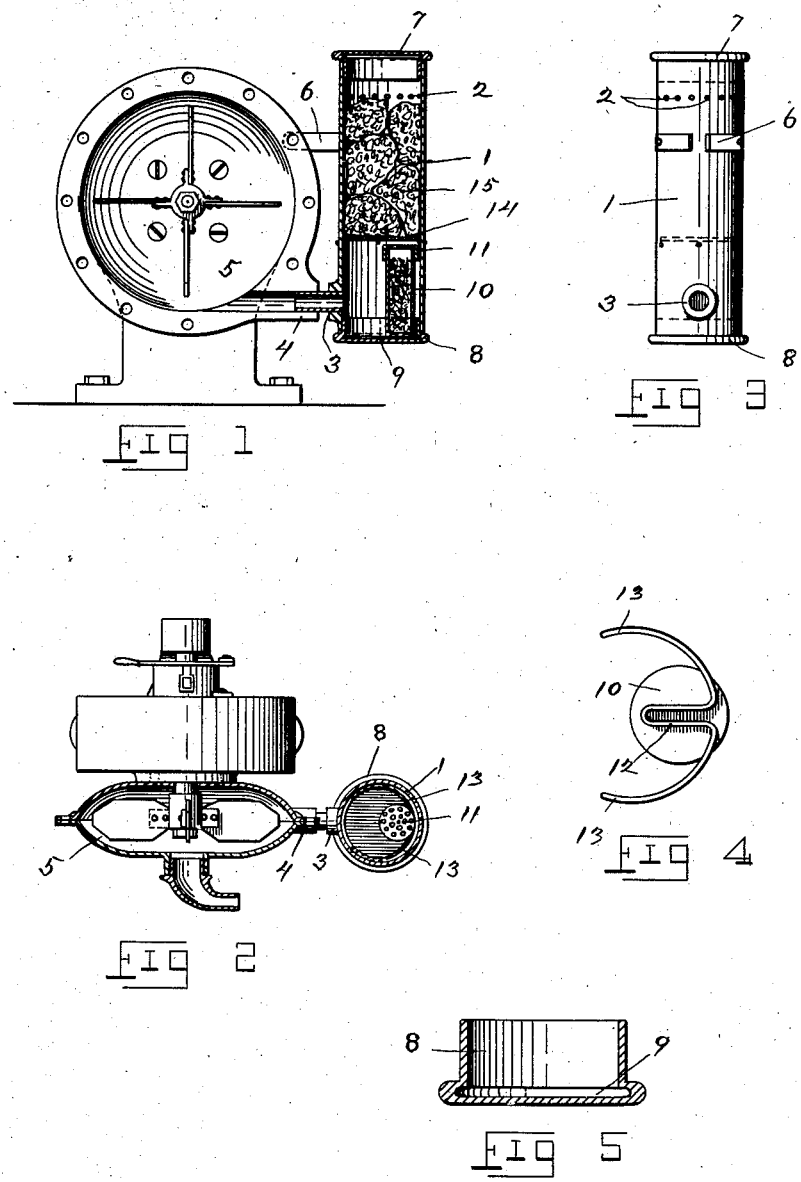
WITNESSES
INVENTOR
Harry K. Diffenderfer,
BY
ATTORNEY

UNITED STATES PATENT OFFICE.

HARRY K. DIFFENDERFER, OF LANCASTER, PENNSYLVANIA, ASSIGNOR TO LANCASTER SANITARY APPLIANCE COMPANY.

AIR FILTER AND PURIFIER.

997,442.   Specification of Letters Patent.   Patented July 11, 1911.

Application filed October 25, 1910. Serial No. 588,998.

*To all whom it may concern:*

Be it known that I, HARRY K. DIFFENDERFER, a citizen of the United States, residing at Lancaster, in the county of Lancaster and State of Pennsylvania, have invented certain new and useful Improvements in Air Filters and Purifiers, of which the following is a specification, reference being had therein to the accompanying drawing.

This invention relates to an air filter or purifier of that class in which the air is driven or sucked through the device, and during its passage therethrough is filtered and purified by suitable chemicals therein contained.

The device is especially adaptable for use with a suction device in connection with water closets for purifying the air drawn therefrom by a suitable suction device.

The objects of the invention are to provide an improved construction of air filter and purifier, simple in design, durable and easily cleaned and recharged.

With these and other objects in view my invention consists in certain construction and combination of parts as will hereinafter be fully described and claimed in the annexed specification, and illustrated in the accompanying drawings, which form a part of this application, and in which like figures of reference refer to corresponding parts in all of the views; but it is fully understood that while I have here described my invention as shown, I do not confine myself to the exact design as shown, as slight changes may be made in the construction and arrangements of the several parts without departing from the spirit of the invention.

Figure 1, is a vertical sectional view of the device showing it attached to the discharge of an exhaust fan. Fig. 2, is a horizontal sectional view of the same. Fig. 3, is a side elevation showing the connections. Fig. 4, is a detail bottom view of the inner chemical receptacle, showing the method of attaching. Fig. 5, is a cross-sectional view of the bottom cap.

Referring to the drawings, the device comprises a tubular casing 1, open at both ends, and formed with a series of perforations 2, near the upper end thereof, and an inlet pipe 3, near the bottom thereof, which is connected to the discharge 4, of a motor driven suction fan 5; said casing 1, being further secured to the suction fan case 5, by the brace arms 6. The upper end of said tubular casing 1, is provided with a removable cap 7, and the lower end of said tubular casing 1, is also provided with a removable cap or bottom 8; the inner surface of said bottom 8, being formed with a T-slot 9. Within said tubular casing 1, is placed an inner small chemical receptacle 10, which is provided with a perforated top 11, and which is filled with formaldehyde solution or other similar substance. Said small receptacle 10, is retained within the large casing 1, by a spring 12, which is secured upon the bottom of said receptacle 10, and which is formed with the resilient arms 13, which engage with the T-slot 9. Upon supports above the top of said receptacle 10, rests a perforated diaphragm or disk 14, and the space between said diaphragm 14, and the perforations 2, is filled or packed with an absorbent, such as cotton or sponges 15, which are preferably saturated with a suitable oil, such as oil of winter green, so that the fumes from the formaldehyde and the impure air entering the pipe 3, have to pass through said oil laden substance, and the air is thus purified during its passage through the device.

It is understood that the impure air does not have to be forced through the apparatus as by a blower or fan as here shown, but the device may be directly secured upon the end of the air pipe.

Having thus described my invention what I claim as new and desire to secure by Letters Patent is:—

1. An air-filter and purifier including a casing, an air inlet pipe leading into the lower end of said casing, said casing having a series of perforations near the upper end thereof, a perforated chemical receptacle located in the lower part of said casing, an absorbent packing material located in said case above said chemical receptacle and separated therefrom.

2. An air-filter and purifier including a cylindrical casing provided with removable caps, an air inlet pipe entering said casing near the lower end thereof, said casing formed with outlet perforations near the upper end thereof, a chemical receptacle formed with a perforated top and detachably secured within said casing upon the lower cap thereof, a perforated disk located above said chemical receptacle, and an absorbent material placed within said casing between said disk and the perforations in said casing, for the purpose of charging the passing air with chemicals and filtering the same.

3. An air-filter and purifier of the class described, comprising a tubular casing formed with an air inlet near the bottom and an air outlet near the top thereof, a fumigating device contained in the lower portion of said casing to fumigate the incoming air, and a filtering substance contained in said casing above said fumigating device for the purpose of filtering the air as it passes upward through said casing.

In testimony whereof I affix my signature in presence of two witnesses.

HARRY K. DIFFENDERFER.

Witnesses:
W. J. COULTER,
JOHN J. THOMPSON.